United States Patent
Nakajima et al.

(10) Patent No.: US 6,756,974 B2
(45) Date of Patent: *Jun. 29, 2004

(54) DISPLAY CONTROL APPARATUS AND METHOD

(75) Inventors: Tatsuya Nakajima, Yokohama (JP); Kenichiro Ono, Atsugi (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/157,498

(22) Filed: Sep. 21, 1998

(65) Prior Publication Data

US 2001/0055029 A1 Dec. 27, 2001

(30) Foreign Application Priority Data

Sep. 24, 1997 (JP) .............................................. 9-258984
Nov. 14, 1997 (JP) .............................................. 9-313431

(51) Int. Cl.⁷ ................................................. H04N 3/27
(52) U.S. Cl. ........................ 345/204; 345/1.1; 345/30; 345/205; 345/418; 345/501; 345/522; 345/530; 345/531; 709/1; 709/100
(58) Field of Search ........................... 345/1.1, 30, 205, 345/418, 501, 522, 530, 531; 709/1, 100

(56) References Cited

U.S. PATENT DOCUMENTS

| | | | | |
|---|---|---|---|---|
| 4,455,550 A | * | 6/1984 | Iguchi | 340/511 |
| 4,586,158 A | * | 4/1986 | Brandle | 345/115 |
| 4,691,340 A | * | 9/1987 | Maeda et al. | 379/93.25 |
| 5,029,007 A | * | 7/1991 | Spiero | 348/556 |
| 5,029,112 A | * | 7/1991 | Skamoto et al. | 345/115 |
| 5,157,732 A | * | 10/1992 | Ishii et al. | 382/107 |
| 5,548,696 A | * | 8/1996 | Kubota et al. | 395/135 |
| 5,613,103 A | | 3/1997 | Nobutani et al. | 395/501 |
| 5,731,832 A | * | 3/1998 | Ng | 348/155 |
| 5,736,981 A | | 4/1998 | Nobutani et al. | 345/185 |
| 5,808,693 A | * | 9/1998 | Yamashita et al. | 348/554 |
| 5,831,589 A | * | 11/1998 | Toriyama et al. | 345/112 |
| 5,838,291 A | | 11/1998 | Ohshima et al. | 345/97 |
| 5,894,333 A | * | 4/1999 | Kanda et al. | 348/597 |
| 5,912,656 A | * | 6/1999 | Tham et al. | 345/112 |
| 5,917,883 A | * | 6/1999 | Khutoryansky et al. | 378/116 |
| 5,948,093 A | * | 9/1999 | Swanstrom et al. | 710/267 |
| 5,953,019 A | * | 9/1999 | Shimakawa | 345/508 |
| 5,990,861 A | * | 11/1999 | Eckstein | 345/115 |
| 6,003,064 A | * | 12/1999 | Wicki et al. | 709/200 |
| 6,011,536 A | * | 1/2000 | Hertzmann et al. | |
| 6,014,167 A | * | 1/2000 | Suito et al. | 348/169 |
| 6,184,906 B1 | * | 2/2001 | Wang et al. | 345/521 |
| 6,188,798 B1 | * | 2/2001 | Lee | 382/251 |
| 6,452,628 B2 | * | 9/2002 | Kato et al. | 348/333.12 |
| 6,507,358 B1 | * | 1/2003 | Mori et al. | 348/42 |

* cited by examiner

*Primary Examiner*—Bipin Shalwala
*Assistant Examiner*—Vincent E. Kovalick
(74) *Attorney, Agent, or Firm*—Fitzpatrick, Cella, Harper & Scinto

(57) ABSTRACT

A display control apparatus selectively outputs first image data and second image data to a display device on the basis of a switching instruction to instruct the switching of an image to be displayed by the display device and a result of a discrimination to discriminate whether the image displayed by the display device can be switched or not.

35 Claims, 13 Drawing Sheets

DISPLAY CONTROL APPARATUS AND METHOD

BACKGROUND OF THE INVENTION

1. Field of the Invention

The invention relates to a display control apparatus and, more particularly, to the switching of a plurality of displays.

2. Related Background Art

Hitherto, a display device for inputting an image signal from a computer or the like and displaying an image regarding the image signal has been known. A control of a display in such a kind of display device is realized by using a video signal and vertical and horizontal sync signals from a host computer.

In the case where a plurality of host computers are connected to one display device and video images from those plurality of host computers are switched and displayed, inputs (displays and coordinate inputs by a key input or a mouse) of the connected host computers are switched by the user by using a switch or the like.

To switch the displays of the host computers, it is necessary to connect the host computers by an LAN, cables, or the like and to develop and activate dedicated application software for control.

According to those constructions, however, even in the case where the user has to urgently cope with information from the other hosts instead of information displayed at present, for example, so long as the user does not switch the displays, the displays are not switched and it is impossible to urgently cope with such information.

SUMMARY OF THE INVENTION

It is an object of the invention to solve the problems as mentioned above.

Another object of the invention is to enable displays to be automatically switched.

Still another object of the invention is to improve a using efficiency of the user in case of switching displays.

Under such objects, according to the invention, as one embodiment, there is provided a display control apparatus for controlling a display device, the display device selectively displaying a first image represented by first image data and a second image represented by second image data, said apparatus comprising:

switching instructing means for instructing a switching of images to be displayed by the display device;

discriminating means for discriminating whether the switching of the images displayed by the display device can be performed or not; and control means for allowing the first image data and the second image data to be selectively outputted to the display device on the basis of the switching instruction by the switching instructing means and a discrimination result of the discriminating means.

The above and other objects and features of the present invention will become apparent from the following detailed description and the appended claims with reference to the accompanying drawings.

DETAILED DESCRIPTION OF THE PREFERRED EMBODIMENTS

An embodiment of the invention will now be described hereinbelow with reference to the drawings.

Figure 1:
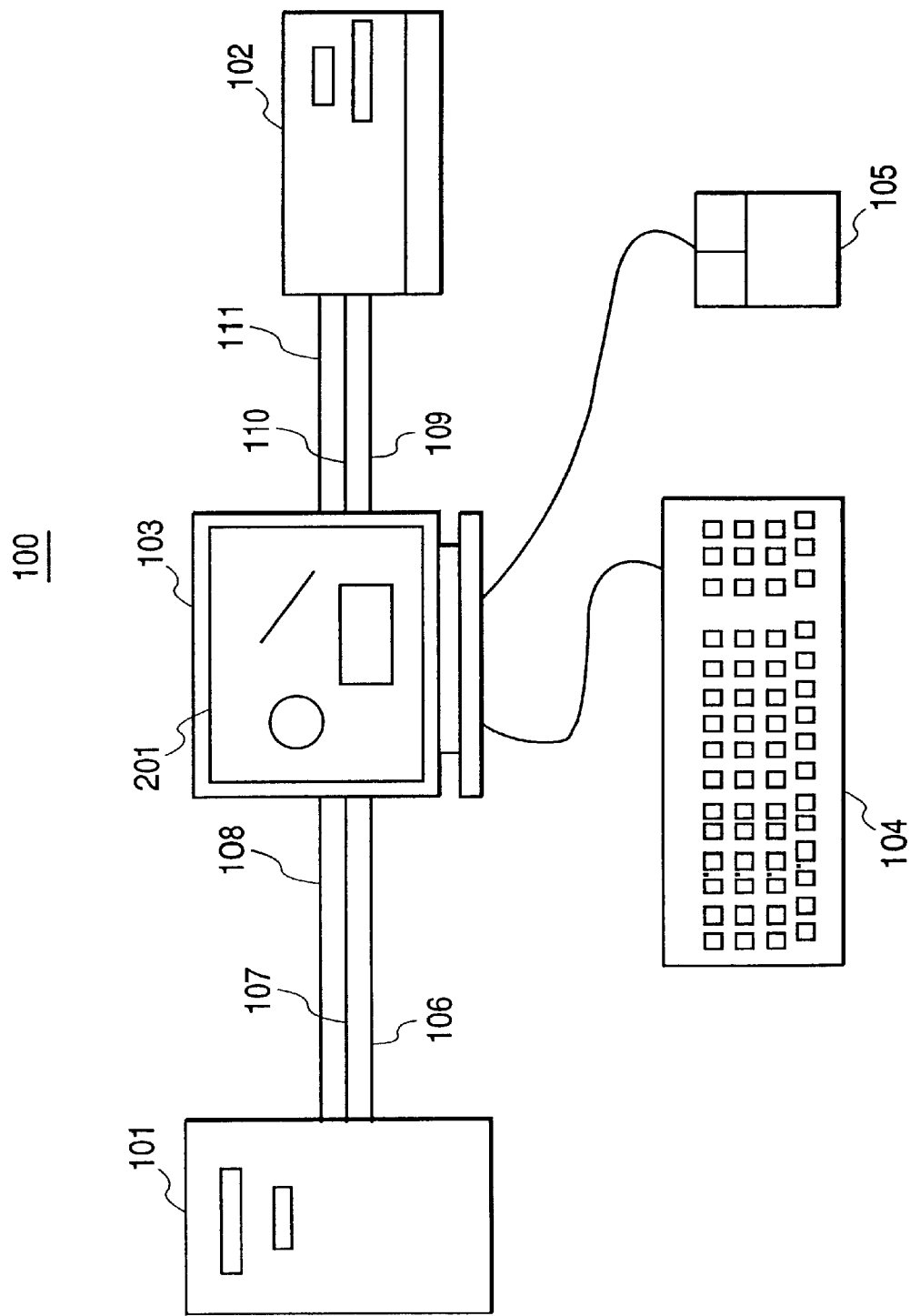
FIG. 1 is a diagram showing a construction of a display system to which the invention is applied.

FIG. 1 is a constructional diagram of a display control system 100 as an embodiment according to the invention.

In FIG. 1, reference numeral 101 denotes a host computer having a high display priority; 102 a host computer having a display priority lower than that of the host computer 101; 103 a display device; 104 a key input device (keyboard); and 105 a coordinates input device (mouse).

In the embodiment of the invention with the above construction, for example, the operation will now be described with respect to the case, as an example, where the operator operates the host computer 102 by using the key input device 104 and mouse 105 while seeing a display screen of a display unit 201 displayed by a video signal 111 sent to the display device 103 from the host computer 102 having the low display priority.

In this instance, input data from the key input device 104 is transmitted to the host computer 102 through a signal line 109. The input data from the mouse 105 is transmitted to the host computer 102 through a signal line 110. The host computer 102 executes a predetermined operation on the basis of the transmission data.

In this state, a video signal 108 is outputted from the host computer 101 to the display device 103. When the display device 103 detects it, the display of the display device 103 is changed to the display of the video signal from the host computer 101 as will be explained hereinlater and the host computer which can be operated by the keyboard 104 and mouse 105 is changed to the host computer 101. Although an input detection of the video signal will be explained hereinlater, a well-known detecting method of detecting that an input level of the video signal is equal to or higher than a predetermined level or the like can be used.

The input data from the keyboard 104 is transmitted to the host computer 101 through a signal line 106. The input data from the mouse 105 is transmitted to the host computer 101 through a signal line 107. The host computer 101 executes a predetermined operation on the basis of those transmission data.

In the embodiment, even if the video signal from the host computer 102 was outputted to the display device 103 for such a period of time, it is not displayed so long as the video signal from the host computer 101 is outputted. The input data from the keyboard 104 and the input data from the mouse 105 are not transmitted to the host computer 102.

Figure 2:
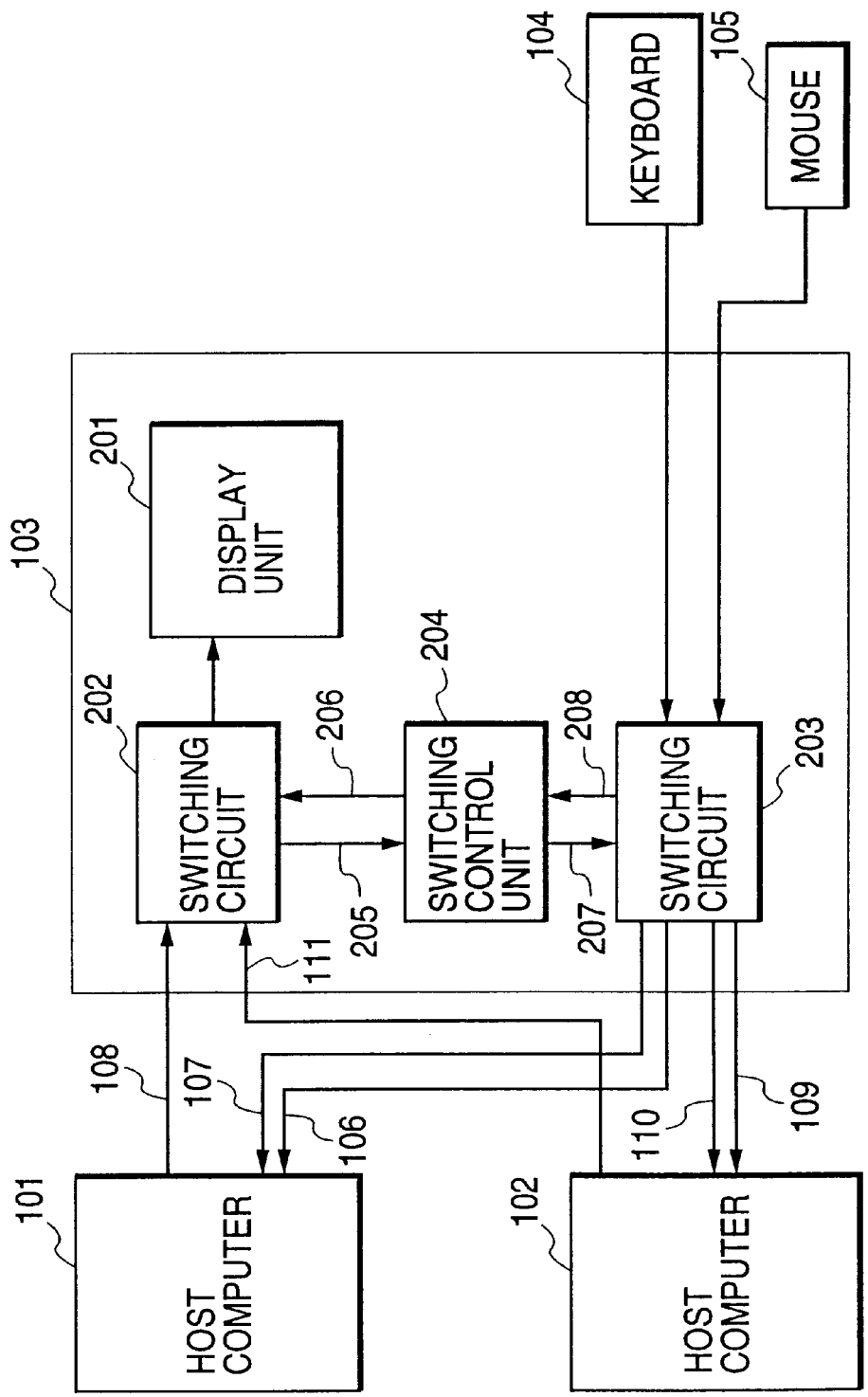
FIG. 2 is a diagram showing a construction of a main section of a display device in FIG. 1.

The display in the display device 103 and the details of a switching control unit of the input data from the input device are shown in FIG. 2. In FIG. 2, reference numeral 201 denotes the display unit including a liquid crystal panel, a driver, and the like; 202 a video switching circuit; 203 an input device switching circuit; and 204 a switching control unit.

The video signal 108 from the host computer 101 and the video signal 111 from the host computer 102 are inputted to a video switching circuit 202 of the display device 103. Either one of them is selected and sent to the display unit 201 and is displayed and outputted as video data.

The switching control unit 204 receives the video signals 108 and 111 from the host computers 101 and 102 through a signal line 205 irrespective of a switching result and always monitors them. The switching control unit 204 controls the video switching circuit 202 and input device switching circuit 203 in accordance with the presence or absence of the video signal from each computer.

The host computers 101 and 102, keyboard 104, and mouse 105 are connected to the input device switching circuit 203. The data from the keyboard 104 and mouse 105 is inputted. In accordance with the control of the switching control unit 204, either one of the key input signal lines 107 and 110 from the keyboard 104 or either one of the mouse input signal lines 106 and 109 from the mouse 105 is selectively outputted to the host computer 101 or 102.

A signal indicating whether an input result from the input device is being transferred to the host computer or not (inputting process is being continued or not) is outputted to the switching control unit 204 through a signal line 208.

The switching control unit 204 holds display priority information of each of the connected computers as a priority table. In accordance with a detection result showing the presence or absence of the video signals 108 and 111 from the host computers 101 and 102 from the video switching circuit 202 and on the basis of input information 208 from the keyboard 104 and mouse 105, the switching control unit 204 controls the video switching circuit 202 so as to output the video signal from the host having the highest display priority to the display unit 201 and display by a control signal line 206. The switching control unit 204 also controls the input device switching circuit 203 so as to switch the connection between the input device and the host computer by a control signal line 207.

Figure 4:
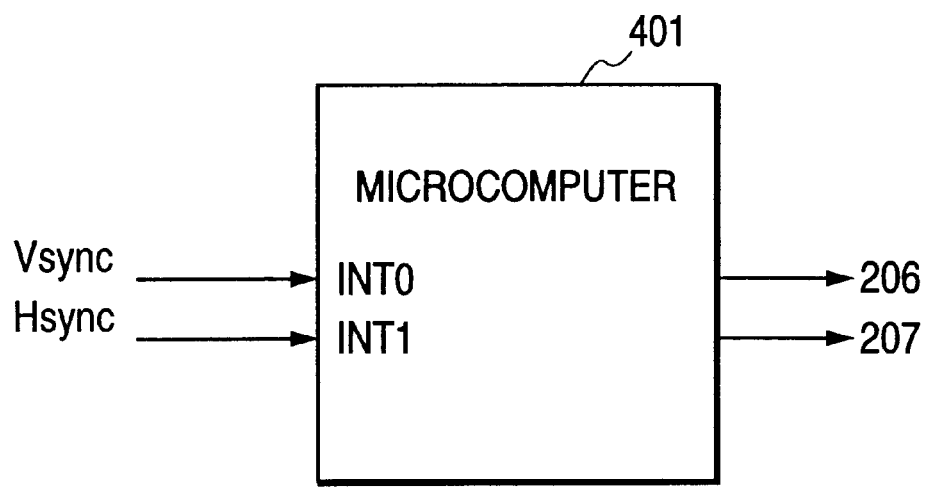
FIG. 4 is a diagram showing a construction of a switching control unit in the device of FIG. 2.

In the case where only two host computers are connected to the display device 103 as in the embodiment, the switching control can be performed by merely outputting the signal indicative of the presence or absence of the video signal from the computer having the high display priority. In this case, there is no need to provide the priority table. In case of connecting three or more hosts to the display device 103, the video images to be displayed are obviously switched in accordance with the priority table. In the example, the two host computers 101 and 102 are connected to the display device 103 as mentioned above. FIG. 4 shows an example of a construction of the switching control unit 204 in the case where the host computer 101 is a computer having a high display priority. In the example shown in FIG. 4, various controls are executed by a microcomputer 401.

In FIG. 4, reference numeral 401 denotes the microcomputer. A vertical sync signal (Vsync) and a horizontal sync signal (Hsync) in the video signal 108 from the host computer 101 are inputted through the signal line 205 to interruption input terminals (INT0, INT1) of the microcomputer 401.

When active inputs (High→Low→High) of the signals Vsync and Hsync are inputted, the microcomputer 401 discriminates that they are the interruption inputs, shifts a control mode to a switching control, and outputs a switching signal 206, thereby switching a switch of the video switching circuit 202 shown in FIG. 2 to the host computer 101 side. The microcomputer 401 also outputs a switching signal 207 and switches a switch of the input device switching circuit 203 shown in FIG. 2 to the host computer 101 side.

Figure 3:
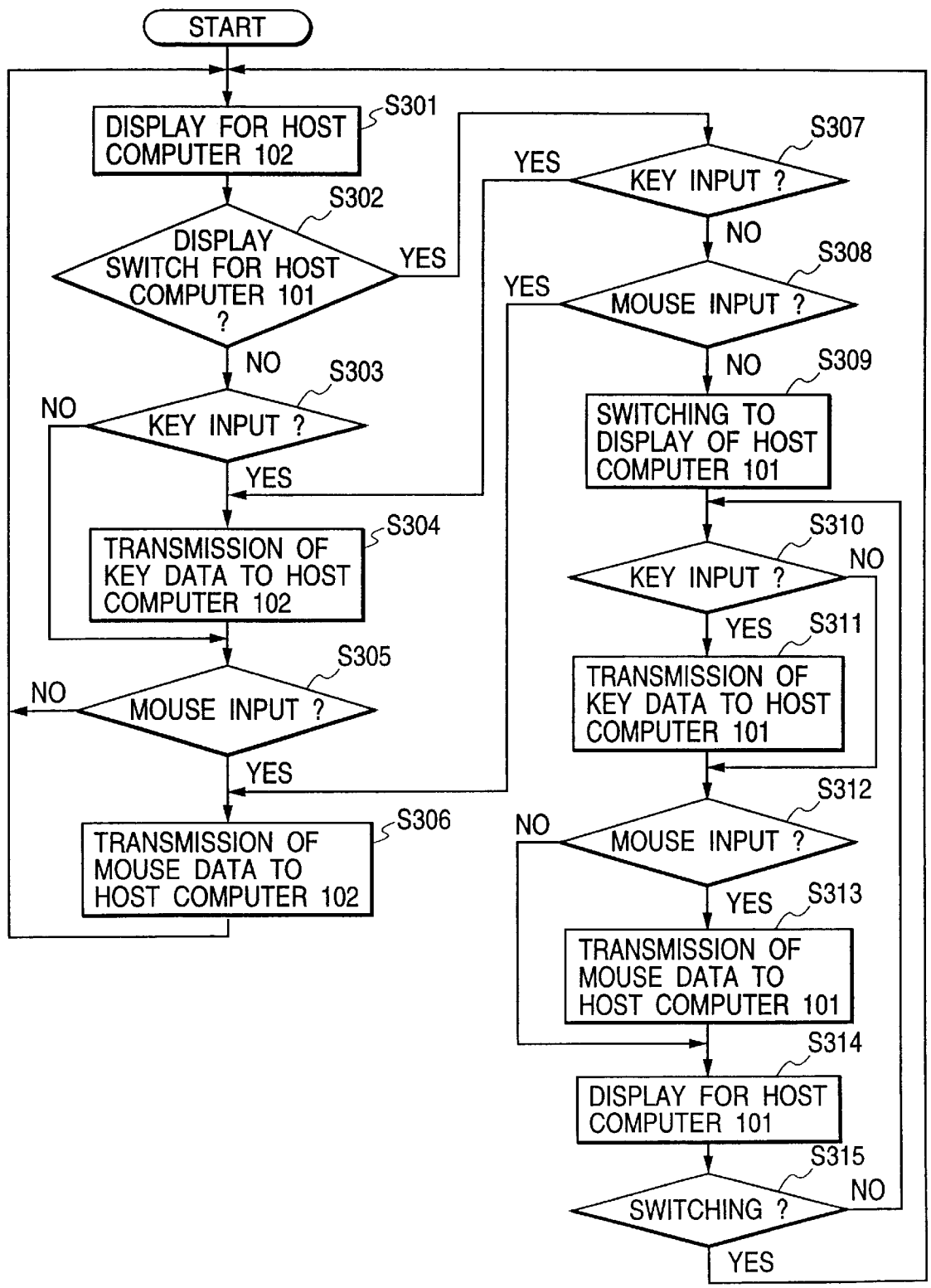
FIG. 3 is a flowchart for explaining the operation of the device of FIG. 2.

The details of the display switching control and the input switching control by the microcomputer 401 shown in FIG. 4 will now be described with reference to FIG. 3. FIG. 3 is a control flowchart for the switching control unit 204.

In FIG. 3, step S301 shows a state in which, for example, the display is switched to the display (second priority or lower) of the video signal from the host computer whose priority is not the highest, namely, the host computer having equipment of a high display priority (for instance, the host computer 102) by the switching operation and the display screen of the display unit 201 of the display device 103 is displayed. In this case, both of the video switching circuit 202 and input device switching circuit 203 transmit and receive data to/from the relevant computer.

In step S302, the input of the video signal from the equipment having a priority higher than that of the input displayed at present is monitored. If the video signal from the equipment having a higher display priority is not inputted, the processing routine advances to step S303.

If the video signal from the equipment having the higher display priority is not inputted in step S302, step S303 follows and a check is made to see if there is input data from the keyboard 104. If there is not a key input from the keyboard 104 in step S302, step S305 follows.

If there is the key input from the keyboard 104 in step S303, step S304 follows and the key data inputted from the keyboard 104 is transmitted to the host computer displayed at present. Step S305 follows. In step S305, a check is made to see if there is input data from the mouse 105. If there is no data input from the mouse 105, the processing routine is returned to step S301.

If there is an input from the mouse 105 in step S305, step S306 follows and the inputted mouse data is transmitted to the host computer displayed at present. The processing routine is returned to step S301 and the transmitted data is displayed.

If the video signal from the equipment having the higher display priority is inputted in step S302, step S307 follows and a check is made to see if there is input data from the keyboard 104. When there is a key input from the keyboard 104 in step S307, step S304 follows. The key data inputted from the keyboard 104 is transmitted to the host computer displayed at present.

When there is no key input from the keyboard 104 in step S307, step S308 follows and a check is made to see if there is input data from the mouse 105. If there is data input from the mouse 105, step S306 follows and the inputted mouse data is transmitted to the host computer displayed at present.

If there is no input from the mouse 105 in step S308, step S309 follows and the video switching circuit 202 is controlled, thereby switching the output of the video signal to the video signal 108 from the computer 101 of the higher display priority. Thus, the display of the display device 103 is switched to the display of the computer 101 of the higher display priority.

In step S310, a check is made to see if there is input data from the keyboard 104. If there is no key input from the keyboard 104 in step S310, step S311 follows.

When there is a key input from the keyboard 104 in step S310, step S311 follows and the key data inputted from the keyboard 104 is transmitted to the host computer 101 displayed at present. Step S312 follows.

In step S312, a check is made to see if there is input data from the mouse 105. If there is no data input from the mouse 105, step S314 follows.

When there is an input from the mouse 105 in step S312, step S313 follows. The inputted mouse data is transmitted to the host computer 101 displayed at present. Step S314 follows.

In step S314, for example, so long as there is no switching operation, the transmitted data is displayed in the display unit 201. After that, step S315 follows. When there is again a display switching instruction to the host 102, the processing routine is returned to step S301 and the video image from the host 102 is again displayed.

As mentioned above, although only the hosts 101 and 102 are connected to the display device 103 in the embodiment, in this state, if equipment having a display priority higher than that of the host 101 is further connected and there is a video signal input from this equipment, in a manner similar to that mentioned above, a process corresponding to an instruction input or the like from the relevant computer is finished and, thereafter, the display is switched to the data display from the equipment having the higher display priority. On the other hand, when the computer displayed at present is the highest priority computer, for example, a control mode is switched to the display control of the other computer of a priority lower than that of the relevant computer by a switching control input of the computer or the like. In this case, the output of the video signal is stopped by the switching operation of the switch and the control also advances to step S301.

According to the embodiment of the invention as described above, even if the display data from a plurality of host computers is transmitted, they can be switched to the display from the computer having a higher necessity in accordance with the priority. The operator of the host computer can immediately display useful information.

Even after the display was switched, if the input from the keyboard or mouse is continued, the display is not switched until the input is finished. Therefore, a situation such that the host computer on the switching source side erroneously operates can be effectively prevented.

Another embodiment of the invention will now be described. In the embodiment, the display is not switched in dependence on the presence or absence of the video signal but the comparison about whether the input data is the data of the video information of a higher priority or not is executed every frame. When there is a change, the display is controlled so as to be switched to the display screen of a higher priority.

In the embodiment as well, a fundamental construction of the system is similar to that of the foregoing embodiment and the system fundamentally has the construction of FIGS. 1 and 2 and executes the control shown in FIG. 3. As compared with the foregoing embodiment, a construction of the detecting means of the priority video input differs. The construction different from that of the foregoing embodiment will now be described hereinbelow.

Figure 5:
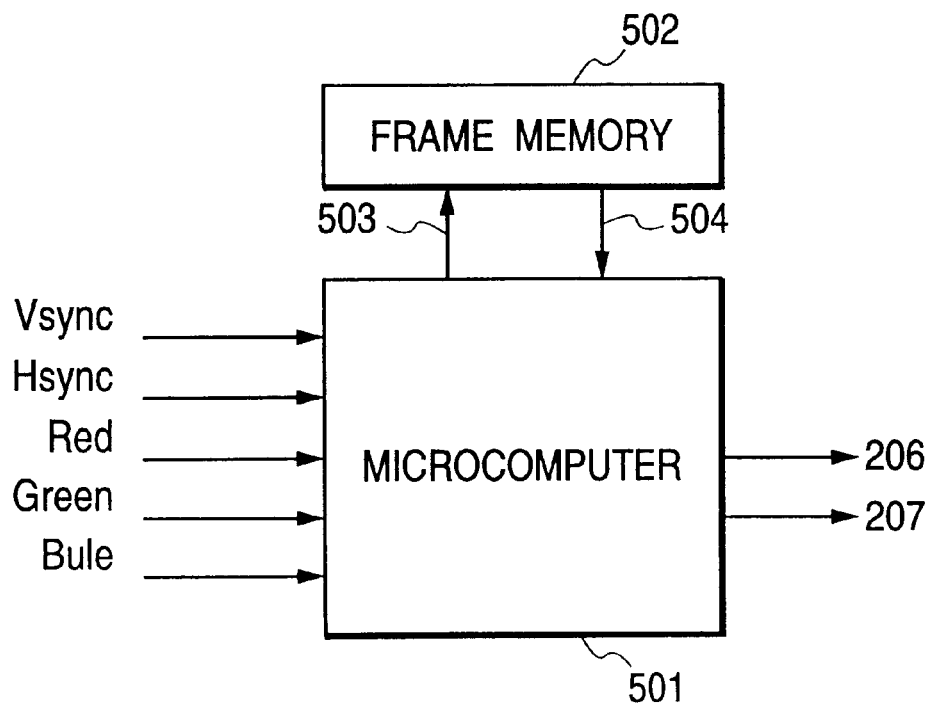
FIG. 5 is a diagram showing another construction of the switching control unit in the device of FIG. 2.

FIG. 5 is a diagram showing an example of a detailed construction of the switching control unit 204 in the embodiment. In a circuit shown in FIG. 5, data of video information of a higher priority is compared every frame and, when there is a change, the display is switched to the display screen of the higher priority.

In FIG. 5, reference numeral 501 denotes a microcomputer and 502 indicates a frame memory to temporarily store input image data. A vertical sync signal (Vsync), a horizontal sync signal (Hsync), a red sync signal (Red), a green signal (Green), and a blue signal (Blue) from a video data cable 108 of the host computer having a higher display priority are inputted to input terminals of the microcomputer 501, respectively.

The microcomputer 501 temporarily stores input image data 503 from each input terminal into the frame memory 502, fetches each of the signals inputted at present to the input terminals, and compares a video signal 504 read out from the frame memory 502. When there is a change as a result of comparison, it is regarded that a video signal is newly inputted to the input terminal, so that the microcomputer generates the display switching signals 206 and 207, thereby changing the priority display switching.

Even in the circuit of FIG. 5 described above, by performing the above control, operations and effects similar to those in the foregoing embodiment are obtained.

The invention can be applied to a system comprising a plurality of equipment (for example, a host computer, interface equipment, a reader, a printer, and the like) or can be also applied to an apparatus (for example, a copying apparatus, a facsimile apparatus, or the like) comprising one piece of equipment.

It will be obviously understood that the object of the invention is also accomplished by a method whereby a storing medium in which program codes of software to realize the functions of the embodiment mentioned above have been recorded is supplied to a system or an apparatus and a computer (or a CPU or an MPU) of the system or apparatus reads out and executes the program codes stored in the storing medium.

In this case, the program codes themselves read out from the storing medium realize the function of the embodiment mentioned above and the storing medium in which the program codes have been stored constructs the invention.

As a storing medium to supply the program codes, for example, it is possible to use a floppy disk, a hard disk, an optical disk, a magnetooptic disk, a CDROM, a CD-R, a magnetic tape, a non-volatile memory card, an ROM, or the like.

It will be obviously understood that the invention incorporates not only a case where the functions of the embodiment mentioned above are executed by executing the readout program codes by the computer but also a case where on the basis of an instruction of the program codes, an OS (Operating System) or the like which operates on the computer executes a part or all of the actual processes and the functions of the embodiment mentioned above are realized by the processes.

Further, the invention also incorporates a case where after the program codes read out from the storing medium were written into a memory provided for a function expansion board inserted in a computer or a function expanding unit connected to the computer, on the basis of an instruction of the program codes, a CPU or the like provided for the function expansion board or the function expanding unit executes a part or all of the actual processes, and the functions of the embodiment mentioned above are realized by those processes.

In case of applying the invention to the storing medium, program codes corresponding to the above-described flowcharts are stored in the storing medium.

According to the embodiment as described above, priorities are allocated to a plurality of processing data inputs in accordance with a supply destination of the processing data and the data to be processed can be automatically selected and the necessary data process can be certainly performed.

Even when the selection is changed, an erroneous operation in association with the change can be effectively prevented.

Another embodiment of the invention will now be described.

Figure 6:
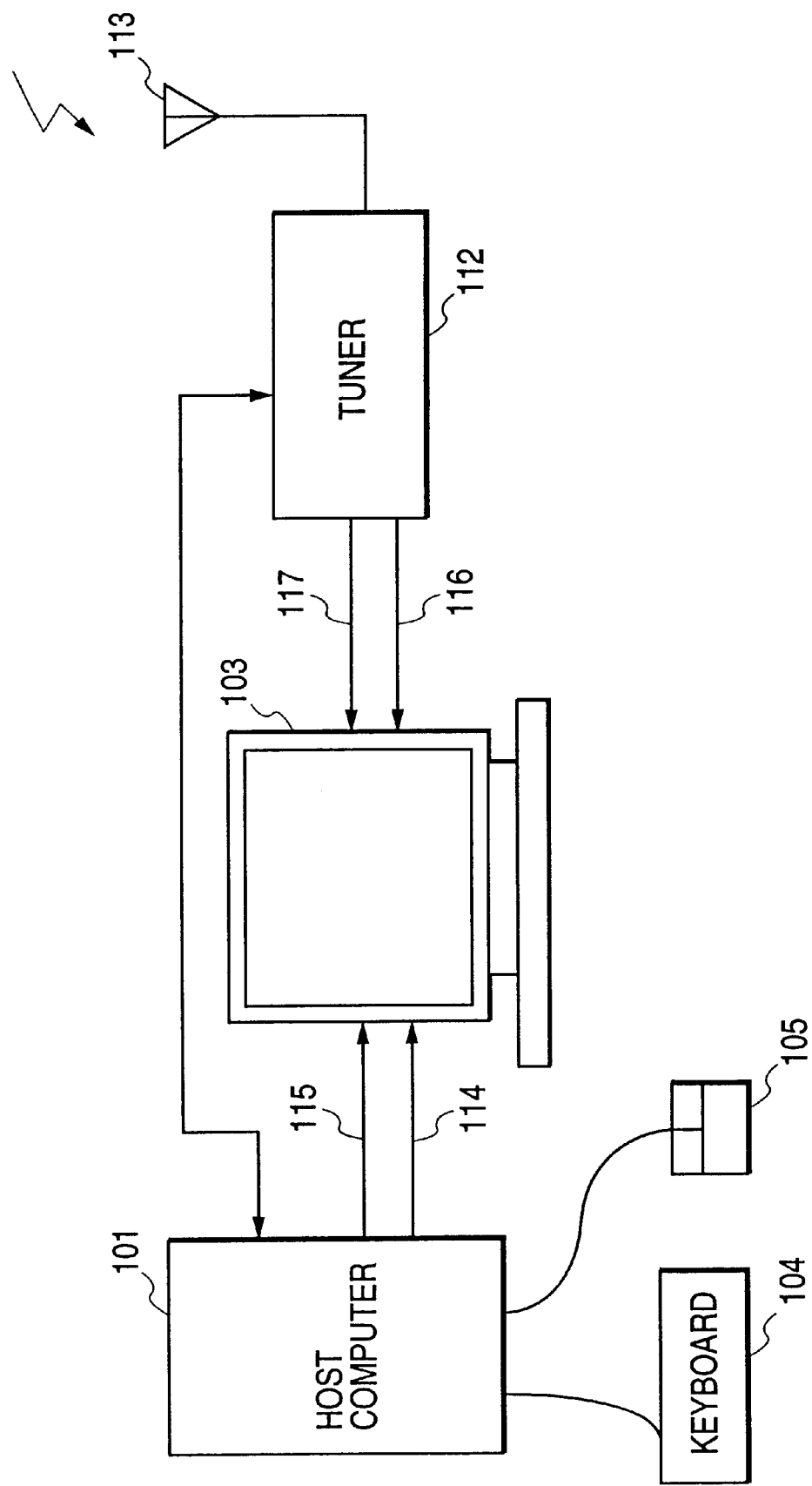
FIG. 6 is a diagram showing another construction of a display system to which the invention is applied.

FIG. 6 is a diagram showing a construction of display control system 200 of the embodiment and component elements similar to those in FIG. 1 are designated by the same reference numerals and will be explained.

According to the system 200 of the embodiment, the host computer 101 and a tuner 112 are connected to the display device 103 and a video image from the host computer 101 and a video image from the tuner 112 are selectively displayed on the display device 103.

The tuner 112 receives the signal received by the antenna 113 and detects information which is included in the received signal and will be broadcasted. This broadcasting scheduled information is sent from the tuner 112 to the host computer 101. The user can see programs and can set a reservation in the host computer 101 by using the broadcasting scheduled information. The reservation can be also set even by the single tuner 112.

The display device 103 receives a video signal 116 and a state signal 117 from the tuner 112 and receives a video signal 114 and a state signal 115 from the host computer 101. On the basis of those signals, the presence or absence of the image by each video signal, the state of the tuner 112, and the state of the host computer 101 are monitored and the display of a higher priority is selected and displayed in accordance with the state.

Figure 7:
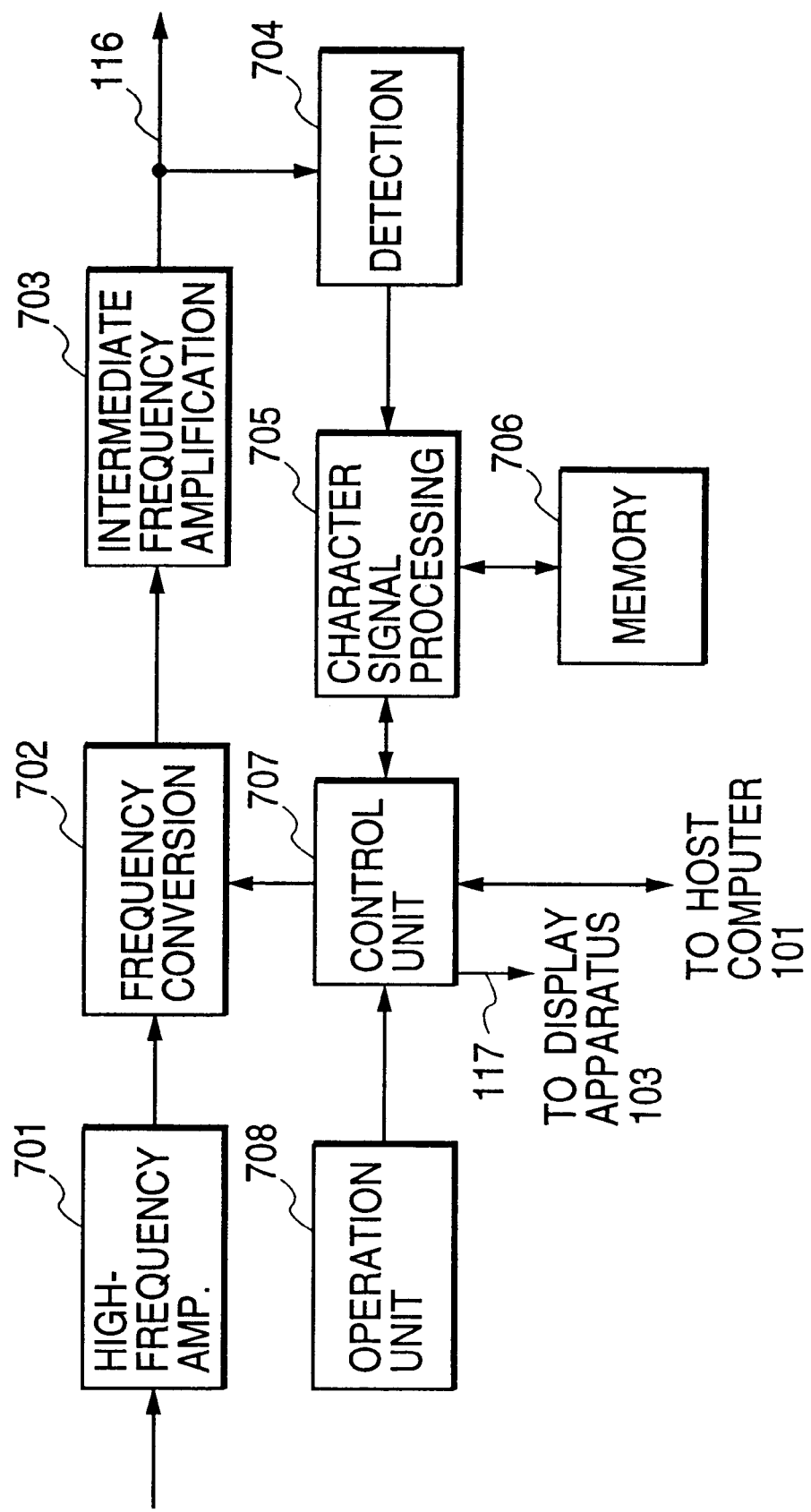
FIG. 7 is a diagram showing a construction of a tuner in FIG. 6.

FIG. 7 is a block diagram showing a construction of the tuner 112.

In FIG. 7, a signal received by an antenna 113 is inputted to a high-frequency amplifier 701. The high-frequency amplifier 701 amplifies the received signal and outputs the amplified signal to a frequency conversion circuit 702. The frequency conversion circuit 702 extracts a signal of a channel (frequency) set by a control unit 707 and supplies it to an intermediate frequency amplification circuit 703.

The intermediate frequency amplification circuit 703 amplifies the signal inputted from the frequency conversion circuit 702 and supplies to the display device 103 and a detection circuit 704. The detection circuit 704 extracts the broadcasting scheduled program information from the signal from the intermediate frequency amplification circuit 703 and outputs to a character signal processing circuit 705. The character signal processing circuit 705 forms a program table on the basis of the broadcasting scheduled information and successively preserves and writes it into a memory 706, thereby continuously updating the latest program table. In response to a request from the control unit 707, data of the program table is sent to the host computer 101.

The control unit 707 sends the data of the program table to the host computer 101 and receives a reservation of the program by the host 101. The control unit receives a change of the reception channel and a reservation of the program in accordance with the operation of the operation unit 708. The control unit 707 generates the state signal 117 to the display device 103 in accordance with the switching of the reception channel or the instruction of the program reservation by the operation unit 708.

As mentioned above, the host 101 can perform the reservation setting of the program by the tuner 112 by using the keyboard 104 or mouse 105. In the embodiment, besides the video signal 114, the state signal 115 showing a state of change of the video signal is outputted from the host 101 to the display device 103.

A switching control of the display video images in the display device 103 will now be described.

Figure 8:
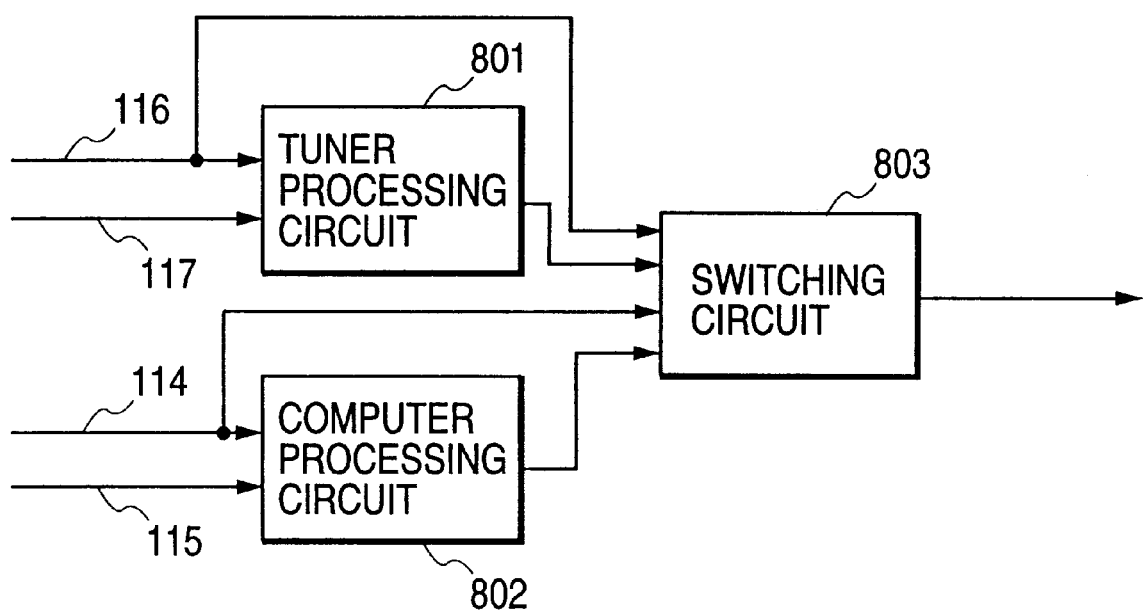
FIG. 8 is a diagram showing a construction of a main section of a display device in FIG. 6.

FIG. 8 is a diagram showing a construction of main section of the display device 103.

In FIG. 8, the video signal 116 and state signal 117 from the tuner 112 are supplied to a tuner processing circuit 801. On the basis of the state signal 117, in the case where the state is changed from the absence to the presence of the video signal from the tuner 112 (for example, in the case where a power source of the tuner 112 is turned on), the case of a video display of the program reservation, or the case where a control signal showing a request for display switching is generated and an event of a channel change or the like is detected, a control signal showing that the display switching is impossible is generated for a predetermined period of time and is outputted to a switching circuit 803.

The video signal 114 and state signal 115 from the host 101 are supplied to a computer processing circuit 802. On the basis of the state signal 115, in the case where the state is changed from the absence to the presence of the video signal from the host 101 (for example, when a power source of the host 101 is turned on), the case where the video data which is supplied from the host 101 changes, or the case where the control signal showing the display switching request is generated and the key input by the keyboard 104, input by the mouse 105, or the like is detected, the control signal showing that the display switching is impossible is generated to the switching circuit 803.

The switching circuit 803 selects either the video signal from the tuner 112 or the video signal from the host 101 and outputs to a display unit (not shown) on the basis of control signals from the tuner processing circuit 801 and computer processing circuit 802.

The above operation will now be described with reference to a flowchart of FIG. 9.

Figure 9:
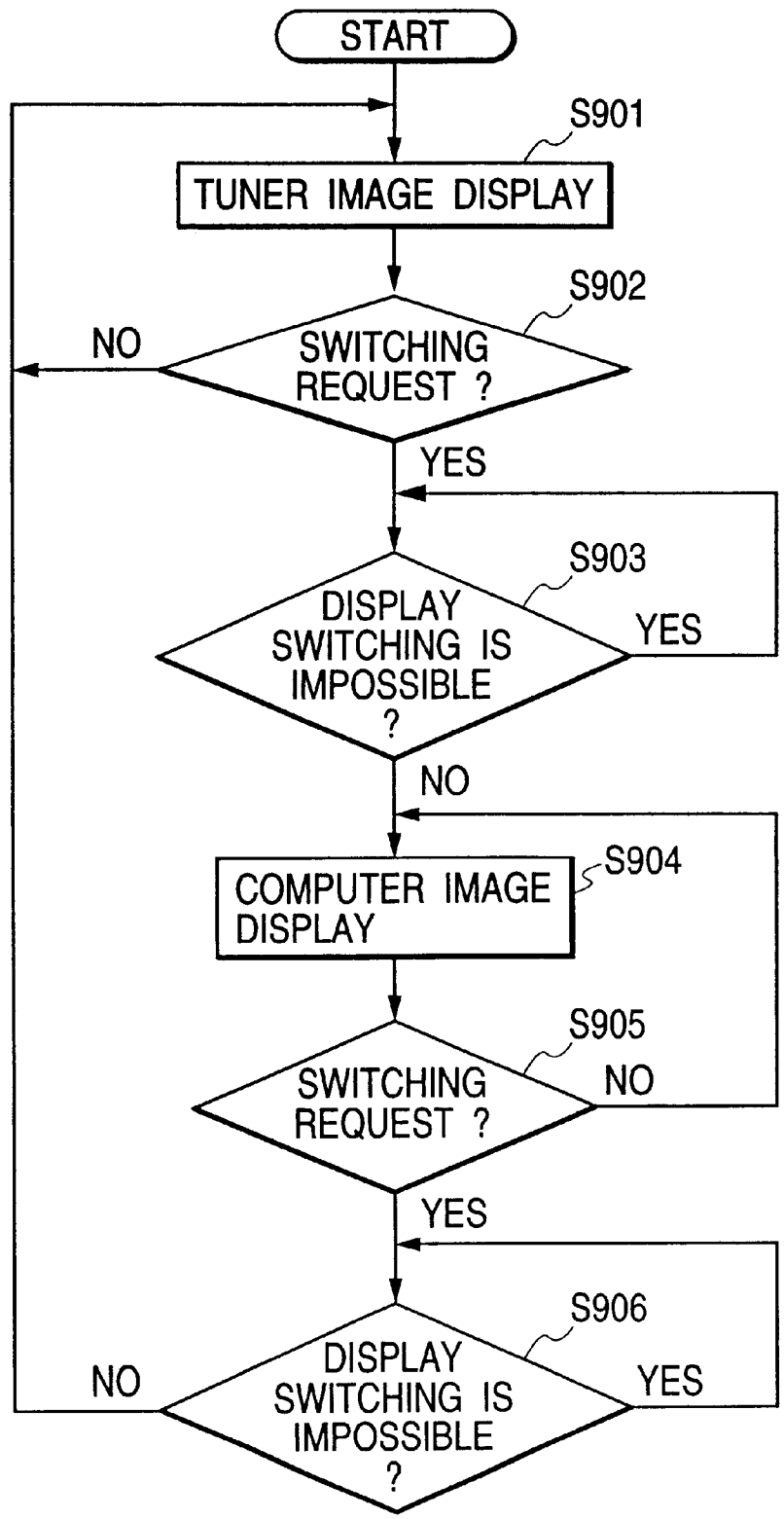
FIG. 9 is a flowchart for explaining the operation of a switching circuit in FIG. 8.

In FIG. 9, it is assumed that the video image from the tuner 112 is first displayed (step S901) and a check is now made to see if the control signal showing the display switching request has been inputted from the host 101. When there is the switching request (step S902), a check is made to see if the control signal showing that the display switching is impossible has been generated from the tuner 112 (step S903). If it is not outputted, the image of the host 101 is outputted to the display unit (not shown). When the control signal indicating that the display switching is impossible is outputted, the apparatus waits until the display switching becomes possible.

After switching to the display of the host 101 in step S904, a check is subsequently made to see if the control signal showing the display switching request has been inputted from the tuner 112. When there is the switching request here (step S905), a check is made to see if the control signal showing that the display switching is impossible has been generated from the host 101 (step S906). When it is not generated, the image from the tuner 112 is outputted. When the control signal showing that the display switching is impossible is outputted, the apparatus waits until the display switching becomes possible.

As mentioned above, in the embodiment, a plurality of external equipment are connected to one display device and when the video images from those external equipment are switched and displayed by the display device, even if there is the display switching request, the display switching operation is not soon performed but the previous video image is displayed for a period of time during which the switching impossible signal is generated.

Therefore, for example, if there is the display switching request when the video image from the tuner is displayed, after completion of the channel switching in the tuner, the display is switched to the video image from the host. Thus, after the user confirmed the video image of the channel after completion of the switching, the display can be switched to the video image of the host and a using efficiency is extremely high. The erroneous operation in association with the channel switching can be also prevented.

On the contrary, in the case where there is the display switching request from the tuner when the video image from the host is displayed, the display is switched to the video image of the tuner after the key input or the input by the mouse was finished in the host, so that there is no fear such that the host computer erroneously operates.

In the embodiment, the switching of the display image has been controlled in accordance with the display switching request from each of the tuner and the host. However, in a manner similar to the foregoing embodiment, it is also possible to construct in a manner such that priorities are allocated to a plurality of equipment connected and only when there is a video signal display switching request from the equipment having a higher priority, the state of the control signal showing that the display switching is impossible is detected.

The embodiment has been described with respect to the case where the host computer and the tuner are connected to one display device. However, as another construction, for instance, a VTR, a cam corder, a digital camera, or the like can be also connected. In this case as well, an effect similar to that in the embodiment is derived.

Although the embodiment has been described with respect to the case of connecting a plurality of external apparatuses to one display device, the invention can be also applied to a construction such that the functions of a tuner, a VTR, a cam corder, and the like are built in one computer as software or hardware and the displays of the images processed by those functions are switched. In this case, a similar effect is derived.

Still another embodiment of the invention will now be described.

Figure 10:
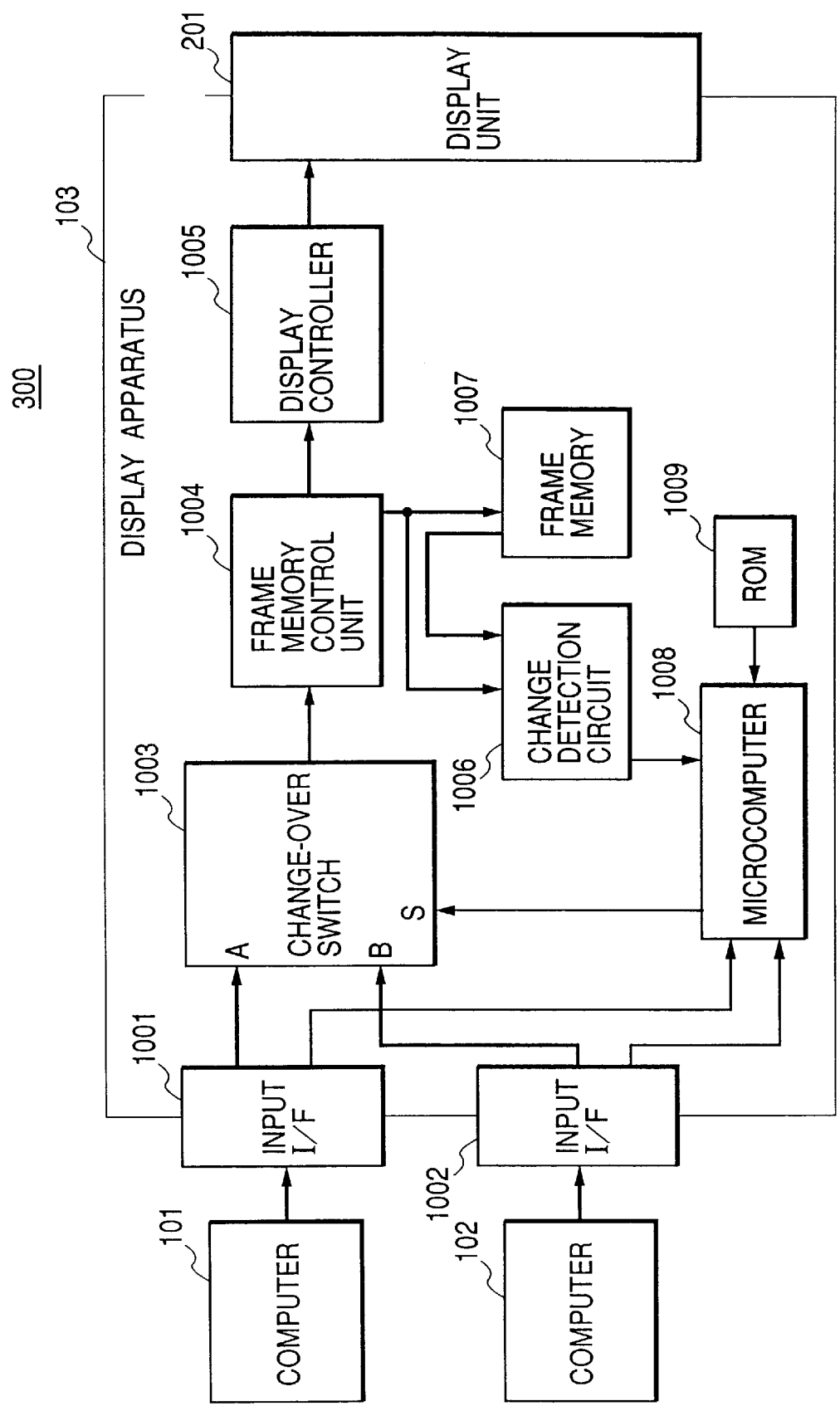
FIG. 10 is a diagram showing still another construction of a display system to which the invention is applied.

FIG. 10 is a diagram showing a construction of a display system 300 of the embodiment and component elements similar to those in the foregoing embodiment are designated by the same reference numerals and will be explained.

In FIG. 10, each of the host computers 101 and 102 generates vertical and horizontal sync signals, a video data signal, and a clock signal to the display device 103. In this instance, if the output signal from the computer 101 or 102 has a digital value of LVDS (Low Voltage Differential Signaling), an input interface unit 1001 and an input interface unit 1002 converts the signal into a digital signal of an ordinary voltage in which 3.3V or 5V is set to the high level. A change-over switch 1003 switches an A input and a B input and outputs in accordance with a state of a switch input S.

Figure 11:
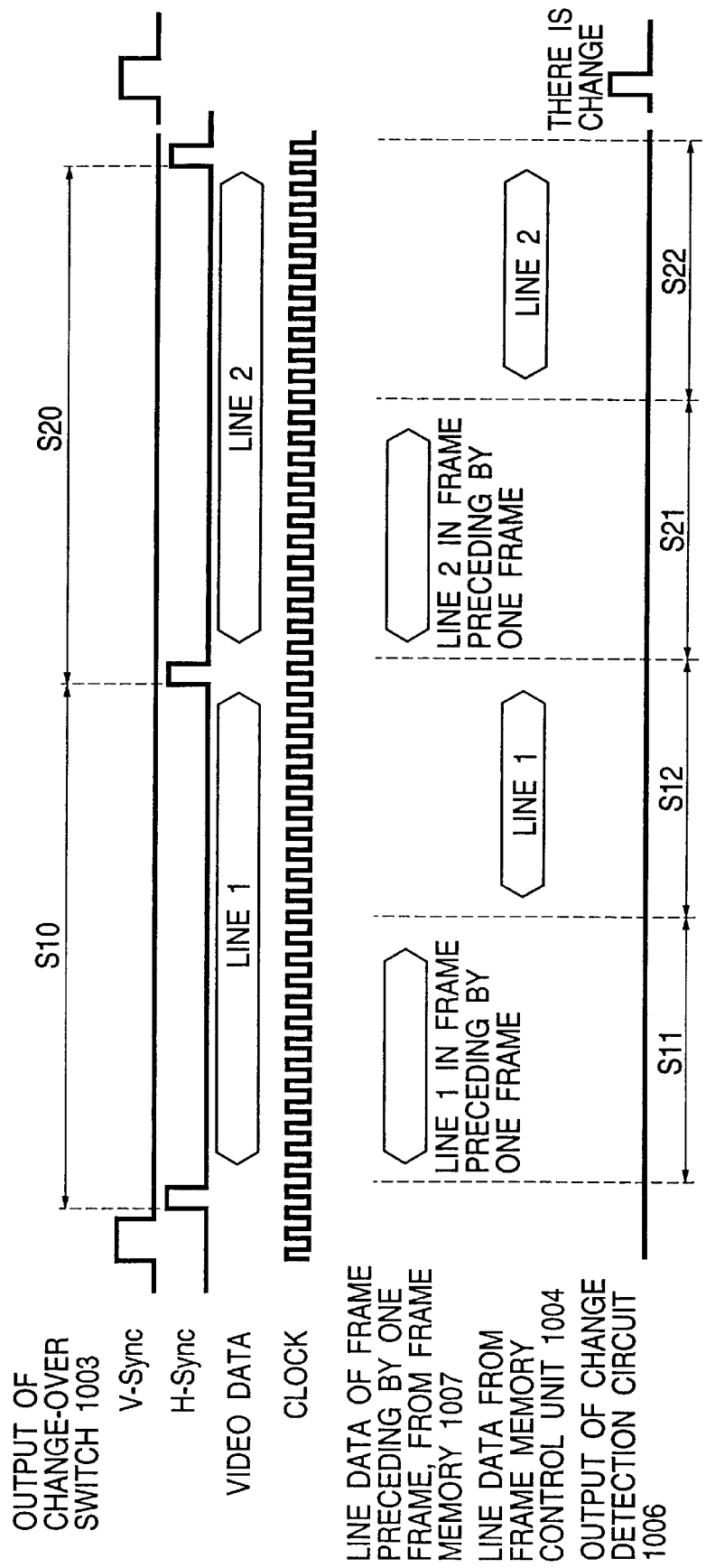
FIG. 11 is a diagram for explaining the operation of a display device in FIG. 10.

A frame memory control unit 1004 performs a control to store the inputted video data into a frame memory 1007 having a capacity of one frame. A display controller 1005 transfers the display data to the liquid crystal panel display 201 such as an FLCD (Ferroelectric Liquid Crystal Display) or the like at a proper timing, thereby displaying. Specifically speaking, a portion with a change in the newly inputted image is detected and the image data of this portion is rewritten. A change detection circuit 1006 inputs the vertical and horizontal sync signals, video data, and clock signal from the frame memory control unit 1004 and inputs the video data of the frame that is preceding by one frame from the frame memory 1007. As an operation of the change detection circuit 1006, a well-known partial rewriting technique in the control of the FLCD is applied. FIG. 11 shows timings.

In FIG. 11, the line data 1 of the first line and the horizontal sync signal are outputted from the change-over switch 1003 within a time of a state S10 as a period of the signal Hsync. The line data of the line that is preceding by one line is outputted from the frame memory 1007 to the change detection circuit 1006 in a period of time of S11 as a former half period of S10. The line data is outputted from the frame memory control unit 1004 to the frame memory 1007 and change detection circuit 1006 in a period of time of S12 as a latter half period of S10.

Figure 12:
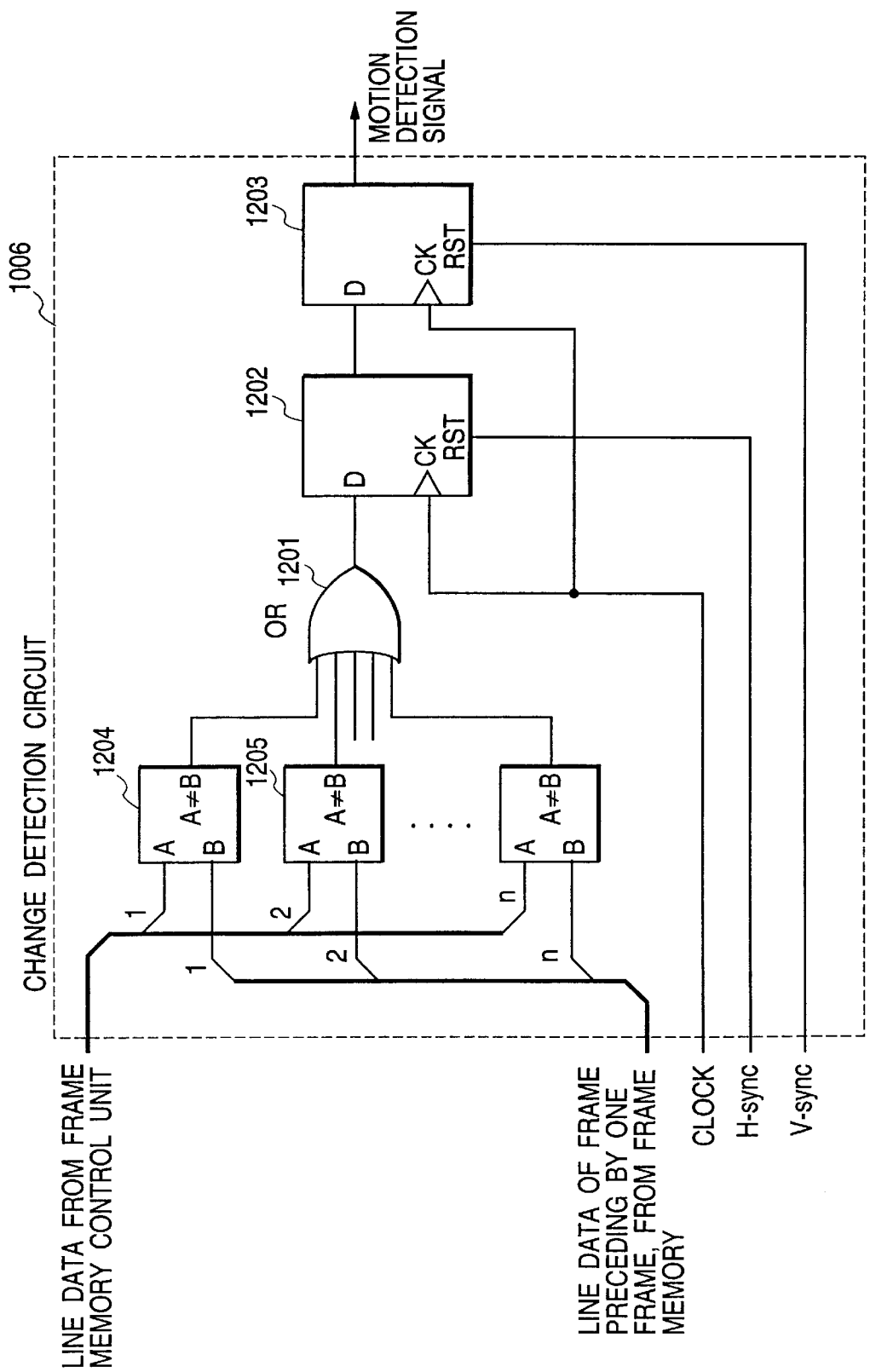
FIG. 12 is a diagram showing a construction of a change detection circuit in FIG. 10.

FIG. 12 shows the first embodiment of the change detection circuit 1006. In FIG. 12, now assuming that the video data has a data width of n bits, the bits of the data of the present frame from the frame memory control unit 1004 and of the video data of the preceding frame from the frame memory 1007 are compared by n comparators (1204, 1205, . . . ). If they do not coincide, "1" is outputted. In the video data, the data is often divided into data of three primary colors of red (R), green (G), and blue (B). However, for instance, now assuming that each of the RGB data has the colors of eight bits, n is equal to 24. An OR circuit 1201 calculates the OR of outputs of all of the comparators and transfers it to a D-FF (D flip-flop) 1202. Since the D-FF 1202 uses the clock signal from the frame memory control unit 1004 as a clock input and uses the horizontal sync signal as a reset signal, if there is a dissidence between the bits within the horizontal sync period, the output signal changes to "1". Since a D-FF 1203 uses the clock signal from the frame memory control unit 1004 as a clock input and uses the vertical sync signal as a reset signal, if there is a dissidence between the bits, the output signal changes to "1" every vertical sync period as shown in FIG. 11 and uses this signal as a motion detection signal.

If the motion detection signal does not change to "1" for a predetermined period, a microcomputer 1008 determines the switching of the input and changes a switching signal to the change-over switch 1003, thereby switching the inputs A and B.

Clock signals are outputted from the input I/F units 1001 and 1002 to the microcomputer 1008. If it is determined that the clock signal is generated, the microcomputer 1008 can decide that the computer is connected. It is, consequently, possible to construct such that when the computer 101 or 102 is not connected, the microcomputer 1008 does not perform the input switching operation.

The above description will now be specifically shown. Now, assuming that the change-over switch 1003 selects the A input, for instance, the A input signal is displayed by the display 201 through the frame memory control unit 1004 and display controller 1005. At the same time, the data of the A input signal is stored every frame into the frame memory 1007. The change detection circuit 1006 compares the data just inputted to the change-over switch 1003 with the data of the line preceding by one line from the frame memory 1007 and generates a signal indicating whether (there is a change "1") or (there is not a change "0") every vertical sync period to the microcomputer 1008. When the motion detection signal does not change to "1" in a predetermined period, the microcomputer 1008 changes the switching signal to the change-over switch 1003 and switches the input to the B input. The above processes are likewise repeated after that.

Figure 13:
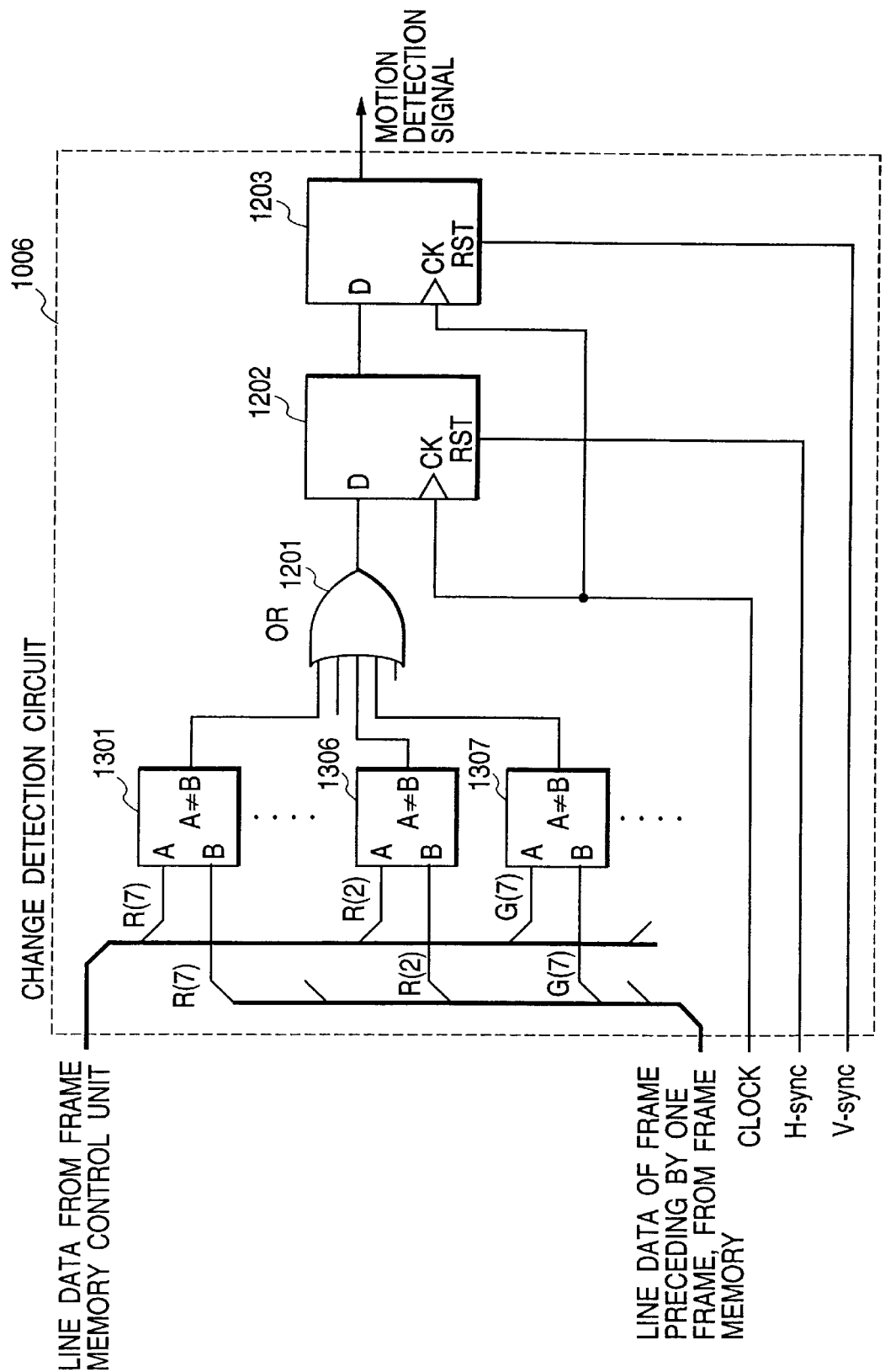
FIG. 13 is a diagram showing another construction of the change detection circuit in FIG. 10.

FIG. 13 shows the second embodiment of the change detection circuit 1006.

In FIG. 13, as for the video data from the frame memory control unit 1004 or frame memory 1007 which is inputted to comparators (1301 to 1307), only upper six bits of each of the RGB data are compared. This is because a weight of data is used and it is considered that an influence on the lower significant data is small in the discrimination about whether the image data differs from the image of the preceding frame or not. There is an advantage such that a circuit construction is simple.

The upper six bits of the R data are connected to the comparators 1301 to 1306. As for the G and B data, they are also similarly connected to the comparator 1307 and subsequent comparators. Total 18 outputs of the comparators are inputted to the OR circuit 1201.

The whole construction and operation are similar to those of the circuit of FIG. 12.

Figure 14:
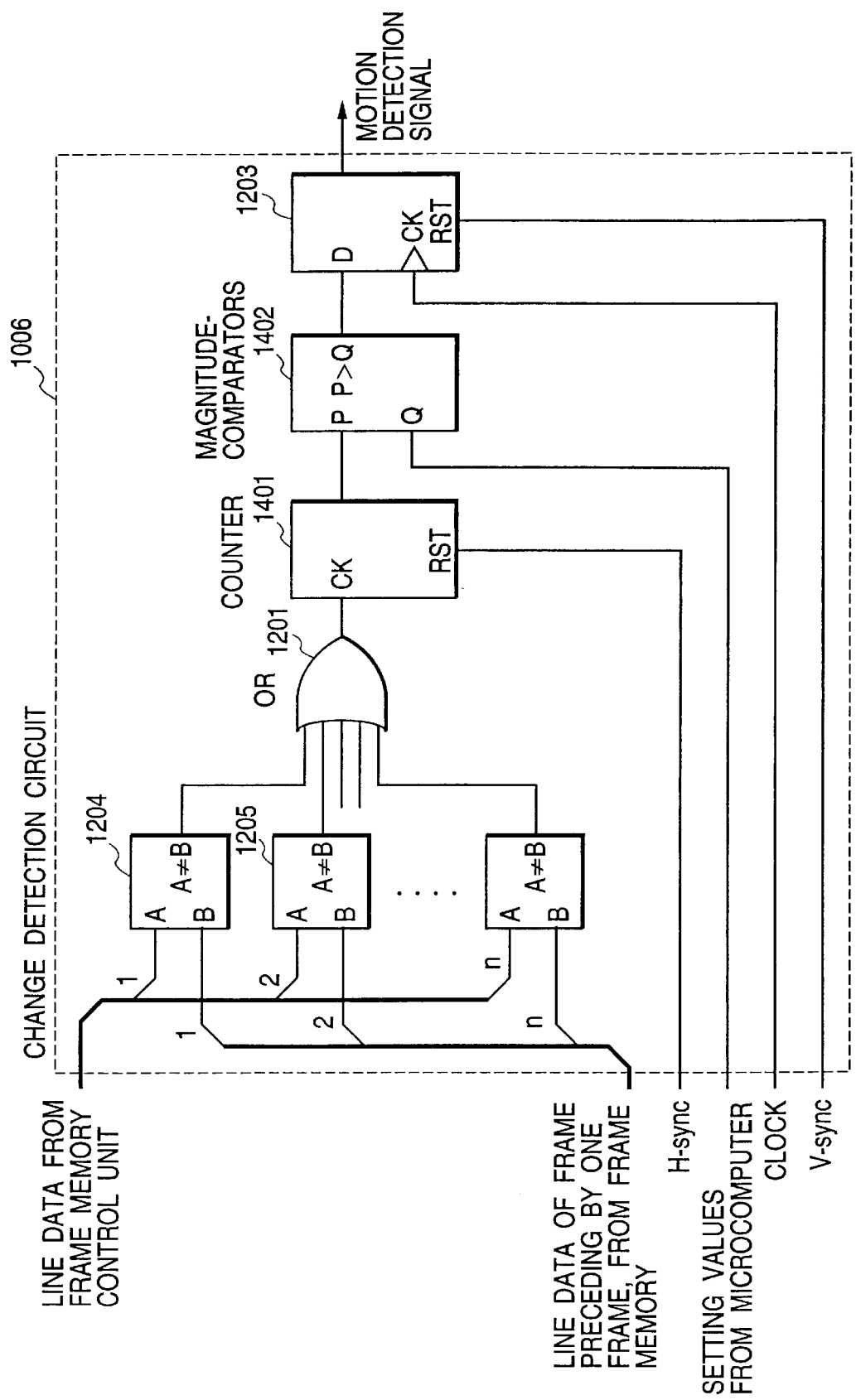
FIG. 14 is a diagram showing still another construction of the change detection circuit in FIG. 10.

FIG. 14 shows the third embodiment of the change detection circuit 1006.

In FIG. 14, an output of the OR circuit 1201 is connected to a counter 1401 and the number of times of dissidence in one horizontal sync period is counted. In a magnitude-comparator 1402, a set value from the microcomputer 1008 is connected to an input Q and an output from the counter 1401 is connected to an input P. The comparator 1402 generates "1" when the number of times of dissidence is larger than the set value, namely, when P>Q.

With this construction, when the number of times of dissidence in the horizontal sync period reaches a predetermined number of times, the motion is detected. When the change is small, the motion is not detected. Therefore, the apparatus is strong against noises.

The whole construction and operation are similar to those in the circuit of FIGS. 12 and 13.

It is also possible to construct in a manner such that a pair of counter 1401 and comparator 1402 are provided in the vertical sync direction or are also provided in both of the horizontal and vertical sync directions.

An ROM 1009 in FIG. 10 constructs a storing medium according to the invention and stores programs to execute the foregoing processes of the microcomputer 1008. As a storing medium, a semiconductor memory, an optical disk, a magnetooptic disk, a magnetic medium, or the like can be also used.

A CRT can be also used as a display 201.

According to the embodiment as described above, when the screen does not change in a predetermined time, the screen can be automatically switched. Therefore, for instance, by automatically switching the input when the input video signal does not change for a predetermined period of time during the working in a certain computer, there is an advantage such that it is convenient to confirm a reception of an electronic mail of another computer or the like.

Many widely different embodiments of the present invention may be constructed without departing from the spirit and scope of the present invention. It should be understood that the present invention is not limited to the specific embodiments described in the specification, except as defined in the appended claims.

What is claimed is:

1. A display control apparatus for inputting first image data representing a first image from a first source and second image data representing a second image from a second source and for controlling a display device so as to display the first image and the second image, said apparatus comprising:

switching instructing means for generating an instruction for switching of images to be displayed by the display device from the first image to the second image;

receiving means for receiving an operation instruction from a manual operation member and for outputting the operation instruction to the first source and the second source;

discriminating means for discriminating whether the switching of the images from the first image to the second image instructed by said switching instruction means can be performed on the basis of an input state of the operation instruction to the first source by the manual operation member when the switching instruction is generated by said switching instruction means; and control means for allowing the second image to be effectively displayed by said display device instead of the first image on the basis of the discrimination result of said discriminating means.

2. An apparatus according to claim 1, wherein the first image data is supplied from first external equipment and the second image data is supplied from second external equipment.

3. An apparatus according to claim 2, wherein the first external equipment includes a computer and said discriminating means executes the discriminating process on the basis of an operation of an input member to the computer.

4. An apparatus according to claim 3, wherein said control means preferentially selects the second image data rather than the first image data and supplies the selected image data to the display device.

5. An apparatus according to claim 2, wherein the first external equipment includes a tuner and said discriminating means executes the discriminating process on the basis of an operation of the tuner.

6. An apparatus according to claim 1, further comprising:

an operating member; and processing means for performing a process regarding the image displayed by the display device in accordance with an operation of said operating member, and wherein said discriminating means executes the discriminating process on the basis of the presence or absence of the operation of said operating member.

7. A display control apparatus for supplying a display device with a plurality of image data, comprising:

processing means having a plurality of processing functions for processing the plurality of image data, respectively;

manual instruction means for manually giving a necessary instruction to said processing means;

selecting means for selectively outputting the plurality of image data to the display device, said processing means processing the selected image data according to the instruction given by said manual instruction means;

switching means for directing a switching of the image data to be outputted by said selecting means from one image data to another image data of the plurality of image data; and control means for controlling an operation of said selecting means on the basis of an input state of the instruction by said manual instruction means when said switching means directs the switching of the image data.

8. An apparatus according to claim 7, wherein in the case where a direction to switch to image data obtained by a processing function of higher priority than a processing function of predetermined image data selected by said selecting means is issued, said control means controls said selecting means so as to switch from the predetermined image data to the image data having a higher priority after completion of input of the instruction by said manual instruction means for the processing function of the predetermined image data.

9. An apparatus according to claim 7, wherein the plurality of processing functions are realized by software.

10. An apparatus according to claim 7, wherein the plurality of processing functions are realized by hardware.

11. A computer readable storing medium in which a program has been stored, wherein said program is used to execute:

a plurality of processing functions for processing a plurality of image data, respectively;

a supplying process for supplying instruction given by a manual instruction member to the plurality of processing functions;

a selecting process for selectively outputting the plurality of image data to a display device, wherein said plurality of processing functions process the selected image data according to said instruction given by the manual instruction member;

a switching process for directing a switching of the image data to be outputted by said selecting process from one image data to another image data of the plurality of image data; and a control process for controlling said selecting process on the basis of an input state of the instruction by the manual instruction member when said switching process directs the switching of the image data.

12. A medium according to claim 11, wherein in the case where an instruction to switch to image data obtained by a processing function higher than a processing function of predetermined image data selected by said selecting process is issued, in said control process, said selecting process is controlled so as to switch from the predetermined image data to the image data having a higher priority after completion of the input of the data by said input member for the processing function of the predetermined image data.

13. A display control method of inputting first image data representing a first image from a first source and second image data representing a second image from a second source and of controlling a display device so as to display the first image and the second image, said method comprising the steps of:

generating an instruction for switching of images to be displayed by the display device from the first image to second image;

receiving an operation instruction from a manual operation member and outputting the operation instruction to the first source and the second source;

discriminating whether the switching of the images from the first image to the second image instructed in said switching instructing step can be performed, on the basis of an input state of the operation instruction to the first source by the manual operation member when the instruction is generated in said switching instructing step; and allowing the second image to be effectively displayed by said display device instead of the first image on the basis of the discrimination result.

14. A method according to claim 13, wherein the first image data is supplied from first external equipment and the second image data is supplied from second external equipment.

15. A method according to claim 14, wherein the first external equipment includes a computer, and said discriminating process is executed on the basis of an operation of an input member to the computer.

16. A method according to claim 15, wherein in said control step, the second image data is preferentially selected rather than the first image data and is supplied to the display device.

17. A method according to claim 14, wherein the first external equipment includes a tuner, and said discriminating process is executed on the basis of an operation of said tuner.

18. A method according to claim 13, further comprising the steps of:

performing an operation; and performing a process regarding the image displayed by the display device in accordance with the performed operation, and wherein in said discriminating step, said discriminating process is executed on the basis of the presence or absence of the operation.

19. A method according to claim 13, wherein in said switching instructing step, a change in said first image data or said second image data is detected and a display switching is instructed on the basis of a detection result.

20. A display control apparatus for changing-over images to be displayed by a display device between a first image and a second image, comprising:

processing means for processing the first image and the second image;

manual instruction means for manually giving a necessary instruction to said processing means, with said processing means processing the first image and the second image according to the necessary instruction given by said manual instruction means;

requesting means for outputting a request of displaying the first image; and control means for controlling the change-over of the display of images from the second image which is displayed by said display device to the first image, on the basis of an input state of the necessary instruction for processing the second image, given by said manual instruction means when the request of displaying the first image is outputted by said requesting means.

21. An apparatus according to claim 20, wherein said control means includes detecting means for detecting the input state of the necessary instruction for processing the second image in response to the request output from said requesting means, said control means controlling said display device so that the first image is displayed instead of the second image, in response to a detection result of inputting no necessary instruction for processing the second image displayed by said display device.

22. An apparatus according to claim 20, wherein said requesting means outputs the request according to first image data representing the first image output from a first source.

23. An apparatus according to claim 20, wherein a processing function of said processing means is realized by software.

24. A display control apparatus for inputting first image data representing a first image from a first source and second image data representing a second image from a second source and for controlling a display device so as to display the first image and the second image, a priority being allocated to each of the first image data and the second image data, said apparatus comprising:

requesting means for outputting a request of switching images to be displayed by said display device from the first image to the second image;

receiving means for receiving an operation instruction from a manual operation member and for outputting the operation instruction to the first source and the second source;

discriminating means for discriminating whether the switching of the images from the first image to the second image requested by said requesting means can be performed, on the basis of an input state of the operation instruction to the first source by said manual operation member when said requesting means outputs the request of switching images; and control means for allowing the second image to be effectively displayed by said display device instead of the first image on the basis of the discrimination result of said discriminating means and the priorities of the first image data and the second image data.

25. An apparatus according to claim 24, wherein said first source includes a computer and said discriminating means executes the discriminating process on the basis of an operation of an input member to the computer.

26. An apparatus according to claim 24, further comprising:

an operating member;

processing means for performing a process regarding the image displayed by the display device in accordance with an operation of said operating member, wherein said discriminating means executes the discriminating process on the basis of a state of the operation of said operating member.

27. A display control method of changing-over images to be displayed by a display device between a first image and a second image, comprising the steps of:

processing the first image and the second image;

manually giving a necessary instruction for the processing step, with said processing step including a step of processing the first image and the second image according to the necessary instruction given in said manually giving step;

outputting a request of displaying the first image; and controlling the change-over of display of images from the second image which is displayed by said display device to the first image, on the basis of an input state of the necessary instruction for processing the second image, given in said manually giving step when the request of displaying the first image is outputted in said requesting step.

28. A method according to claim 27, wherein said control step includes a detecting step of detecting the input state of the necessary instruction for the second image in response to the request output in said requesting step, said control step controlling the display device so that the first image is displayed instead of the second image, in response to a detection result of inputting no necessary instruction for the second image displayed by the display device.

29. A method according to claim 27, wherein said requesting step outputs the request according to first image data representing the first image output from a first source.

30. A display control method of inputting first image data representing a first image from a first source and second image data representing a second image from a second source and of controlling a display device so as to display the first image and the second image, a priority being allocated to each of the first image data and the second image data, said method comprising the steps of:

outputting a request of switching images to be displayed by said display device from the first image to the second image;

receiving an operation instruction from a manual operation member and outputting the operation instruction to the first source and the second source;

discriminating whether the switching of the images from the first image to the second image requested in said requesting step can be performed on the basis of an input state of the operation instruction to the first source by the manual operation member when the request of switching images is outputted in said requesting step; and allowing the second image to be effectively displayed by said display device instead of the first image on the basis of a discrimination result in said discriminating step and the priorities of the first image data and the second image data.

31. A computer readable storing medium for storing a program for executing a display control method of changing-over images to be displayed by a display device between a first image and a second image, said program executing the steps of:

processing the first image and the second image;

manually giving a necessary instruction for the processing step, wherein said processing step includes a step of processing the first image and the second image according to the necessary instruction given in said manually giving step;

outputting a request of displaying the first image; and controlling the change-over of display of images from the second image which is displayed by said display device to the first image, on the basis of an input state of the necessary instruction for processing the second image, given in said manually giving step when the request of displaying the first image is outputted in said requesting step.

32. A storing medium according to claim 31, wherein said control step includes a detecting step of detecting the input state of the necessary instruction for the second image, in response to the request output in said requesting step, said control step controlling said display device so that the first image is displayed instead of the second image, in response to a detection result of inputting no necessary instruction for the second image displayed by the display device.

33. A storing medium according to claim 31, wherein said requesting step outputs the request according to first image data representing the first image output from a first source.

34. A computer readable storing medium for storing a program for executing a display control method of inputting first image data representing a first image from a first source and second image data representing a second image from a second source and of controlling a display device so as to display the first image and the second image, a priority being allocated to each of the first image data and the second image data, said program executing the steps of:

outputting a request of switching images to be displayed by said display device from the first image to the second image;

receiving an operation instruction from a manual operation member and outputting the operation instruction to the first source and the second source;

discriminating whether the switching of the image from the first image to the second image requested in said requesting step can be performed on the basis of an input state of the operation instruction to the first source by said manual operation member when the request of switching images is outputted in said requesting step; and allowing the second image to be effectively displayed by said display device instead of the first image on the basis of a discrimination result in said discriminating step and the priorities of the first image data and the second image data.

35. A display control apparatus for supplying a display device with a plurality of image data, comprising:

processing means having a plurality of processing functions for processing the plurality of image data, respectively;

manual instruction means for manually giving a necessary instruction to said processing means;

selecting means for selecting one of the plurality of image data and outputting the selected image data to the display device so that an image represented by the selected image data is effectively displayed by said display device, said processing means processing the selected image data according to said instruction given by said manual instruction means;

switching means for directing a switching of the images effectively displayed by said display device from one image data to another image data of the plurality of image data; and control means for controlling an operation of said selecting means on the basis of an input state of the necessary instruction given by said manual instruction means when said switching means directs the switching of the image data, wherein a priority is allocated to each of the plurality of processing functions and said control means further controls the operation of said selecting means on the basis of the priorities.

* * * * *

UNITED STATES PATENT AND TRADEMARK OFFICE
CERTIFICATE OF CORRECTION

PATENT NO. : 6,756,974 B2
DATED : June 29, 2004
INVENTOR(S) : Tatsuya Nakajima et al.

It is certified that error appears in the above-identified patent and that said Letters Patent is hereby corrected as shown below:

Column 7,
Line 29, "a" (second occurrence) should be deleted, and "display" should read -- a display --.

Signed and Sealed this

Twenty-eighth Day of December, 2004

JON W. DUDAS
*Director of the United States Patent and Trademark Office*